2,715,145

MANUFACTURE OF PHENOL

Thomas Bewley, Epsom, Bertram Ernest Victor Bowen, Tonbridge, Kent, Peter Lionel Bramwyche, London, and Geoffrey William Jackson, Southborough, Kent, England, assignors, by mesne assignments, to Hercules Powder Company, a corporation of Delaware No Drawing. Application May 29, 1950,
Serial No. 165,101

Claims priority, application Great Britain June 3, 1949

8 Claims. (Cl. 260—621)

This invention refers to improvements in the process for the manufacture of phenol and relates in particular to the manufacture of phenol by the decomposition of isopropyl benzene peroxides by means of acidic substances which exert a catalytic action. Such acidic substances are for instance aqueous mineral acids, strong organic acids, hydrogen ion exchange materials and acid treated activated earths. The products of this decomposition reaction are mainly phenol and acetone with alphamethyl styrene and some acetophenone. This invention is based on the discovery that besides the named compounds a residue with a boiling point which is higher than that of phenol and acetophenone is formed and a major proportion of this residue, which may amount to from 2 to 10% or more of the peroxides brought into contact with the acidic catalyst consists of para alpha cumyl phenol, and one of its objects is to improve the yield of phenol and, also, other compounds of economic value.

By the expressions peroxides or peroxidic compounds in this specification are to be understood the hydroperoxide as well as the peroxide of isopropyl benzene.

It is expedient to effect the acid decomposition reaction with a solution of said peroxides in an inert solvent and to use isopropyl benzene as such solvent. With advantage, therefore, the solution which results from the oxidation of isopropyl benzene by means of molecular oxygen at elevated temperatures and wherein only a part of the isopropyl benzene is converted into the corresponding peroxides whilst the remainder serves as solvent for the peroxides, is brought into contact with the acidic catalysts effecting the decomposition of the peroxides. In this case, in addition to the above-named decomposition products unchanged isopropyl benzene is present in the acid decomposition mixture.

According to this invention the process for the manufacture of phenol by the decomposition by means of acidic catalysts of isopropylbenzene peroxides comprises increasing the yield of phenol by decomposing the material contained in the peroxidic acidic catalyst decomposition mixture and boiling at temperatures higher than phenol and acetophenone.

The oxidation of the isopropyl benzene, the decomposition of the peroxidic compounds formed thereby and the recovery of the resulting products may be carried out in accordance with the processes described and claimed in the pending United States applications Serial No. 738,726—filed April 1, 1947, now U. S. Patent 2,547,938 issued April 10, 1951; Serial No. 5178—filed January 29, 1948, now U. S. Patent 2,628,983 issued February 17, 1953; Serial No. 45,326—filed August 20, 1948; and Serial No. 86,258—filed April 8, 1949, now U. S. Patent 2,663,743 issued December 22, 1953.

The decomposition of the peroxidic compounds may be effected by reacting them with an acidic catalyst after they have been isolated from the oxidation reaction mixture or while the said peroxidic compounds are dissolved in unreacted isopropyl benzene.

The decomposition of the material which boils at higher temperatures than the boiling points of phenol and acetophenone may be achieved by heating said material to temperatures at which pyrolysis takes place. These temperatures may vary within wide limits according to the composition of the mixture and the pressure during the heat treatment. Generally speaking, temperatures from 200 to 400° C. have been found to give good results. It is expedient to carry out the decomposition at as low a temperature as possible and effect it at reduced pressure. The products resulting from this decomposition comprise phenol and alphamethylstyrene. Frequently the formation of isopropylbenzene during the heat treatment has also been observed. The desired decomposition may be promoted by the addition to the residue of acids such as sulphuric acid, phosphoric acid or sulphonic acids. Small catalytic amounts of these acids added to the residue allow the decomposition to be effected at lower temperatures than in the absence of added acids. Acid washed activated earth, such as, fuller's earth have also proved useful for promoting the decomposition. It is preferred to effect the decomposition of the material with boiling points which are higher than those of phenol and acetophenone after the compounds with a lower boiling point have been removed from the mixture produced by the acid decomposition of the peroxides. This removal may be complete in which case it is convenient to remove the products resulting from the decomposition of the higher boiling material from the still as they are formed. It is however possible to carry out the decomposition with a material which still contains some of the compounds with lower boiling points such as phenol and acetophenone.

The removal of the compounds with lower boiling points, such as acetone, phenol, alphamethylstyrene and acetophenone from the mixture resulting from the decomposition of the isopropylbenzene peroxides may be achieved by various methods. For instance, the acetone may be removed first by distillation and after its removal the remaining mixture may be subjected to distillation preferably under diminished pressure. Another alternative is to remove the acetone in conjunction with the phenol by treating the decomposition reaction mixture with water, preferably at temperatures between 50 and 100° C., by which means acetone and phenol are dissolved whereas acetophenone and methyl styrene with the unreacted isopropyl benzene, if present, remain undissolved. The acetone may be recovered from the aqueous solution in the well-known way, while acetophenone, isopropyl benzene, if any, and methyl styrene are recovered from the water extracted residue by fractional distillation, preferably under reduced pressure. A further alternative consists in subjecting the reaction mixture originating from the decomposition reaction after said mixture has been separated from the acidic catalysts to fractional distillation preferably under reduced pressure, whereby first the acetone and subsequently isopropyl benzene, if present, then alpha methyl styrene, phenol and acetophenone are recovered in the consecutive distillation fractions. When the reaction products are recovered from the decomposition reaction mixture by fractional distillation it is preferred to carry out the fractionation beyond the removal therefrom of phenol so as to collect at least the major part of the acetophenone present. The fractional distillation of the phenol and acetophenone is preferably carried out under reduced pressure avoiding a temperature in the kettle of the still of more than 200° C. and preferably rising to a temperature not above 160° C. In this way it is possible to obtain the various fractions in a pure state.

By the decomposition of the higher boiling material according to the present invention, considerable additional quantities of phenol and of alphamethylstyrene are obtained. In some cases isopropyl benzene was also recovered amongst the decomposition products. The separation of these reaction products may be effected by fractional distillation, preferably under diminished pressure or the phenol may be extracted therefrom by means of water or aqueous alkaline solutions whilst the separation of alphamethylstyrene from the isopropyl benzene, if present, is effected by distillation. The phenol, when added to the phenol produced as the main product of the acid decomposition of the isopropyl benzene peroxides and recovered from the decomposition mixture prior to the collection of the material with the high boiling points increases the economic value of the whole process of phenol production from isopropyl benzene. In addition, the alphamethylstyrene is a further valuable compound. It may be reconverted to isopropyl benzene by hydrogenation, for example, with a nickel catalyst and may then be recycled to the oxidation process for the production of isopropyl benzene peroxides. If any isopropyl benzene is found among the decomposition products this can be also returned to the oxidation process.

The following examples illustrate the manner in which the process of the invention is carried out in practice:

Example 1

1,000 lbs. of isopropyl benzene were oxidised with oxygen at 130° C. until the reaction mixture contained about 25% isopropyl benzene peroxides. This mixture was stirred vigorously with an aqueous sulphuric acid containing in 100 grams about 45 grams of $H_2SO_4$, at 30° C. whereby the peroxides were converted into acetone and phenol. The oil layer leaving the decomposer was washed successively with small amounts of water and/or aqueous sodium carbonate solution to remove acid and then fed to a continuous still from the top of which a mixture containing 81% acetone, 8% isopropyl benzene and 11% low boiling compounds, including a little water, was removed. The liquid leaving the bottom of the still was fed into a vacuum still operated at 100 mm. In this still 684 lbs. of isopropyl benzene were distilled off from the mixture containing as impurities 0.08% alpha-methylstyrene and 0.29% phenol. The liquid leaving at the base of the said vacuum still is further fractionated in a second vacuum still, the kettle temperature of which was kept below 160° C. The first fractions contained another 14 lbs. of isopropyl benzene and 25 lbs. of alphamethylstyrene, and, as second fraction, were obtained 129 lbs. of 98–99% pure phenol. Finally, a fraction containing acetophenone and phenol was distilled off. 36.2 lbs. of residue remained in the kettle.

This residue was heated to an initial kettle temperature of 240° C. at normal pressure in a gas fired still fitted with a fractionating column. The temperature at the top of the column was kept at about 200° C. and the temperature in the kettle was finally allowed to rise to 400° C. The distillate from this decomposition of the residue contained 11 lbs. of phenol and 8 lbs. of alpha methyl styrene and 8 lbs. of a fraction consisting mainly of isopropyl benzene. This distillate was worked up in the usual way in order to recover the phenol as pure material. The distillate can with advantage be returned to the distillation system, for instance to the still in which the isopropyl benzene is separated from the reaction products.

Example 2

936 parts of a residue as obtained in Example 1 was continuously fed into a still kettle fitted with a fractionating column whilst the vapours were continuously removed, the temperature at the top of the column being kept at 180°–200° C. The temperature in the kettle was allowed to rise to 405° C. 715 parts of a distillate were obtained which contained 242 parts of phenol and 228 parts of alpha methyl styrene and 185 parts consisting mainly of isopropyl benzene.

Example 3

157 parts of the residue as obtained in Example 1 were heated with 1.6 parts by weight of concentrated sulphuric acid to 263° C. final temperature. 108.7 parts of distillate were obtained, containing 41.2 parts of phenol, 23.1 parts of methyl styrene and 44 parts of a fraction consisting mainly of isopropyl benzene.

Example 4

Isopropyl benzene was oxidised with gaseous oxygen to yield a product containing 25% by weight of peroxides. This material was concentrated by removal of the bulk of the unchanged isopropyl benzene in a climbing film evaporator, and the concentrate containing 65% by weight of the peroxide decomposed with 40% w/w sulphuric acid in a continuous reactor under conditions of efficient stirring. The decomposer product was freed from acids by washing with 12% w/v sodium carbonate solution and fractionally distilled to remove as successive fractions acetone, isopropylbenzene plus alpha-methylstyrene, phenol and acetophenone. The high boiling residue from the last distillation (amounting to 21% of the weight of phenol recovered) was decomposed by heating up to 360° C. with an added 0.25% by weight of sulphuric acid. From 165 parts by weight of the residue were obtained in this way 116 parts of a distillate and 47 parts of an undistillable tar. The distillate was found to contain 35 parts of isopropyl benzene, 35 parts of methyl styrene, 34 parts of phenol and 5 parts of acetophenone, together with minor amounts of water and hydrocarbons boiling below isopropyl benzene.

We claim:

1. In the process for the manufacture of phenol by the decomposition of isopropyl benzene peroxides with an acidic catalyst whereby there is formed a decomposition reaction mixture comprising acetone, alpha methyl styrene, phenol, acetophenone and para alpha cumyl phenol, and wherein the acetone, alpha methyl styrene, phenol and acetophenone are substantially separated from said decomposition reaction mixture to leave a residue containing said para alpha cumyl phenol, the improvement which comprises pyrolyzing said residue at a temperature between about 200° and about 400° C. to form additional quantities of phenol and alpha methyl styrene.

2. Process as set forth in claim 1 wherein the pyrolysis of the residue is promoted by the addition thereto of an acidic catalyst.

3. Process as set forth in claim 1 wherein the pyrolysis of the residue is carried out under diminished pressure.

4. Process as set forth in claim 1 wherein the phenol and alpha methyl styrene formed by the pyrolysis of the residue are distilled off as they are formed.

5. Process as set forth in claim 4 wherein the phenol and alpha methyl styrene subsequently are separated by fractional distillation.

6. Process as set forth in claim 4 wherein the phenol and alpha methyl styrene subsequently are separated by extraction of the phenol with a material selected from the group consisting of water and aqueous alkalies.

7. In the process for the manufacture of phenol by the decomposition of an isopropyl benzene peroxide with an acidic catalyst whereby there is formed a decomposition reaction mixture comprising acetone and para-α-cumyl phenol, and wherein the acetone and phenol are substantially separated from said decomposition reaction mixture to leave a residue containing said para-α-cumyl phenol, the improvement which comprises pyrolyzing said residue at a temperature between about 250° and about 400° C. to form additional quantities of phenol.

8. In the process for the manufacture of phenol by the decomposition of an isopropylbenzene peroxide with an acidic catalyst whereby there is formed a decomposition reaction mixture comprising acetone, phenol and para-α-cumylphenol, and wherein the acetone and phenol are substantially separated from said decomposition reaction mixture to leave a residue containing said para-α-cumylphenol, the improvement which comprises heating said residue to temperatures at which pyrolysis takes place to form additional quantities of phenol.

References Cited in the file of this patent

UNITED STATES PATENTS 2,113,951  Shuman _____ Apr. 12, 1938

OTHER REFERENCES

Hock et al., Berichte Der Deutsches Chemisches Gesellschaft, volume 77, B, pages 257–264 (1944).